United States Patent
Seyedi (10) Patent No.: US 11,233,577 B1
(45) Date of Patent: Jan. 25, 2022

(54) OPTICAL COMMUNICATION SYSTEMS AND METHODS TO COMMUNICATE TEMPERATURE VARIATION INFORMATION

(71) Applicant: Hewlett Packard Enterprise Development LP, Houston, TX (US)

(72) Inventor: Mir Ashkan Seyedi, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/948,097

(22) Filed: Sep. 3, 2020

(51) Int. Cl.
| | |
|---|---|
| *H04B 10/00* | (2013.01) |
| *H04B 10/69* | (2013.01) |
| *G02B 6/42* | (2006.01) |
| *G01K 7/00* | (2006.01) |
| *H04B 10/40* | (2013.01) |
| *H04B 10/50* | (2013.01) |
| *G02B 6/293* | (2006.01) |

(52) U.S. Cl.
CPC ........... *H04B 10/6911* (2013.01); *G01K 7/00* (2013.01); *G02B 6/29338* (2013.01); *G02B 6/4246* (2013.01); *H04B 10/40* (2013.01); *H04B 10/50* (2013.01)

(58) Field of Classification Search
CPC combination set(s) only.
See application file for complete search history.

(56) References Cited

U.S. PATENT DOCUMENTS

| | | | |
|---|---|---|---|
| 7,977,622 B2 | 7/2011 | McLaren et al. | |
| 9,369,210 B2* | 6/2016 | Toda | H04B 10/516 |
| 9,513,437 B2* | 12/2016 | Zhang | G02B 6/1225 |
| 10,281,747 B2* | 5/2019 | Padmaraju | H01S 5/142 |
| 10,651,933 B1* | 5/2020 | Chiang | H04B 10/0799 |
| 10,985,841 B1* | 4/2021 | Seyedi | H04B 10/27 |
| 11,005,572 B1* | 5/2021 | Chiang | H03L 1/022 |

(Continued)

FOREIGN PATENT DOCUMENTS

WO 2017/014783 A1 1/2017

OTHER PUBLICATIONS

Addya et al., "Optical Ring Resonator Based Temperature Sensor", Sens Imaging, Springer, vol. 18, No. 33, Nov. 15, 2017, pp. 1-11.

(Continued)

*Primary Examiner* — Agustin Bello
(74) *Attorney, Agent, or Firm* — Hewlett Packard Enterprise Patent Department (57) ABSTRACT

Examples include systems and methods for communicating temperature variation information of a transmitter resonator to a receiver resonator in an optical communication system. Some examples provide a transceiver module that includes a transmitter resonator to transmit optical signals emitted from a light source, a photodetector coupled to the transmitter resonator to detect the optical signals transmitted by the transmitter resonator and generate a photocurrent, and a controller to receive the photocurrent from the photodetector, determine temperature variation information of the transmitter resonator from the photocurrent, and encode the temperature variation information in an outgoing data stream transmitted via the transmitter resonator.

19 Claims, 4 Drawing Sheets

(56) References Cited

U.S. PATENT DOCUMENTS

| | | | |
|---|---|---|---|
| 2006/0067605 A1* | 3/2006 | Mirkarimi | G02B 6/1225 385/12 |
| 2010/0200733 A1* | 8/2010 | McLaren | G02F 1/025 250/214 C |
| 2014/0016931 A1* | 1/2014 | Meade | H04Q 11/0005 398/48 |
| 2014/0169724 A1* | 6/2014 | Ingels | G02F 1/0327 385/9 |
| 2014/0314406 A1* | 10/2014 | Zerbe | H04J 14/02 398/38 |
| 2014/0321848 A1* | 10/2014 | Sekiguchi | H04B 10/516 398/38 |
| 2015/0132015 A1* | 5/2015 | Hayakawa | H04B 10/5057 398/200 |
| 2015/0263190 A1* | 9/2015 | Knights | G02F 1/0147 250/201.1 |
| 2015/0277053 A1* | 10/2015 | Zheng | H04J 14/00 385/31 |
| 2015/0381277 A1* | 12/2015 | Shimizu | H04B 10/079 398/34 |
| 2016/0072586 A1* | 3/2016 | Hochberg | H04B 10/64 398/136 |
| 2016/0131959 A1* | 5/2016 | Zid | G02B 6/29398 385/2 |
| 2016/0282640 A1* | 9/2016 | Guzzon | G02B 6/29338 |
| 2017/0010485 A1* | 1/2017 | Amberg | G02F 1/025 |
| 2017/0176779 A1* | 6/2017 | Hauenschild | G02F 1/0121 |
| 2017/0261692 A1* | 9/2017 | Knights | G02F 1/025 |
| 2018/0212682 A1* | 7/2018 | Chen | H04B 10/506 |
| 2021/0003904 A1* | 1/2021 | Dorta-Quinones | G02B 6/12033 |
| 2021/0255393 A1* | 8/2021 | Mansouri Rad et al. | G02F 1/011 |

OTHER PUBLICATIONS

Bounaas et al., "High Sensitivity Temperature Sensor Based on Photonic Crystal Resonant Cavity", Progress In Electromagnetics Research Letters, vol. 90, Mar. 17, 2020, pp. 85-90.

Kim et al., "Silicon Photonic Temperature Sensor Employing a Ring Resonator Manufactured Using a Standard CMOS Process", Optics Express, Oct. 5, 2010, pp. 22215-22221.

Singha et al., "On-chip Photonic Temperature Sensor Using Micro Ring Resonator", IEEE, Feb. 2-4, 2018, 4 pages.

Xu et al., "Ultra-Sensitive Chip-Based Photonic Temperature Sensor Using Ring Resonator Structures", Optics Express, Feb. 3, 2014, pp. 3098-3104.

* cited by examiner

OPTICAL COMMUNICATION SYSTEMS AND METHODS TO COMMUNICATE TEMPERATURE VARIATION INFORMATION

BACKGROUND

An optical communication system generally includes an optical transmitter, an optical receiver, and an optical fiber connected therebetween. To increase transmission capacity, a wavelength-division multiplexing (WDM) method is often used. The WDM method allows multiple wavelengths to be transmitted in a single physical fiber, thus increasing bandwidth of the transmission. Silicon photonic technologies are often employed in optical communication systems to provide cost effective, high bandwidth, and low latency connections. For example, optical interconnects in the optical communication systems may be based on silicon photonics that use resonator-type modulators. A resonator-type modulator may be a ring resonator that includes a set of waveguides in which at least one may be a closed loop coupled to at least a light input port and a light output port. Due to its compatibility to the fabrication processes of integrated circuits, the resonator-type modulators have a potential for various applications in the optical communication systems.

BRIEF DESCRIPTION OF THE DRAWINGS

The following detailed description references the drawings, wherein.

The figures are not exhaustive and do not limit the present disclosure to the precise form disclosed.

DETAILED DESCRIPTION

Generally, silicon photonic technologies are subject to impact from temperature variations. In particular, the temperature dependence of the refractive index of silicon may cause a shift in the spectral response of a silicon photonic device. As the temperature rises, a corresponding spectral shift (also referred to as red-shift) is towards a longer wavelength and as the temperature decreases, a corresponding spectral shift (also referred to as blue shift) is towards a shorter wavelength.

Ring resonators based on silicon photonic technologies are highly sensitive to temperature in their spectral responses. As a result, a temperature variation can cause a thermal shift in a wavelength of resonance (WoR) of a ring resonator (i.e., a transmitter ring resonator) of a transmitter with respect to that of a ring resonator (i.e., a receiver ring resonator) of a receiver in an optical communication system. This thermal shift can impact the performance and quality of optical links. In this respect, existing technologies seek to measure bit error rate (BER) in the optical links and adjust the temperatures of the transmitter and receiver ring resonators based on the BER counts. The temperatures of the transmitter and receiver ring resonators in the optical communication system are adjusted such that the BER counts are reduced to lower than a threshold.

Various approaches for controlling and synchronizing the temperatures of the transmitter and receiver ring resonators have been proposed. For example, thermal sensors such as resistors or thermistors can be employed to measure the temperatures of the ring resonators as the surrounding temperature varies. Based on the measured temperatures, the temperatures of the transmitter and receiver ring resonators can be adjusted such that the temperatures of the transmitter resonator and the receiver resonator are synchronized to maintain desired WoRs. However, these thermal sensors are generally electronic devices that are subject to impact from the temperature variations, and hence cannot provide accurate and real-time temperature measurements. In some other examples, the ring resonators employed in the transmitter and the receiver, themselves, can act as thermal sensors as well as modulators. The thermal shift in the WoR of a ring resonator can be a measure of real-time temperature variations with high accuracy. However, communicating and using such information for synchronizing the temperatures of the transmitter and receiver ring resonators in the optical communication systems may be a challenge.

Examples described herein provide temperature synchronization techniques in an optical communication system to enable improved temperature control on a transmitter ring resonator of a transmitter and a receiver ring resonator of a receiver, which can often be very far apart physically and in different temperature environments. The techniques may enable use of variations in spectral responses of the transmitter and receiver ring resonators to convey temperature variation information of the respective ring resonators between the transmitter and the receiver. In particular, the techniques may enable to convey a temperature variation value as well as a temperature variation rate of the transmitter ring resonator to the receiver ring resonator. Based on the temperature variation information of the transmitter ring resonator, the receiver may adjust the temperature of its receiver ring resonator for synchronizing temperatures on the transmitter and receiver ring resonators to maintain desired WoRs. In this manner, the techniques disclosed herein provide improved temperature control with high accuracy, which results in reducing errors due to the temperature variation in optical links and improves the overall performance of the optical communication system.

In an example, a transceiver module may include a transmitter resonator to transmit optical signals emitted from a light source, a photodetector coupled to the transmitter resonator to detect the optical signals transmitted by the transmitter resonator and generate a photocurrent, and a controller to receive the photocurrent from the photodetector, determine temperature variation information of the transmitter resonator from the photocurrent, and encode the temperature variation information in an outgoing data stream transmitted via the transmitter resonator. In the examples described herein, the transmitter resonator is a ring resonator.

In an example, an optical communication system may include a first transceiver module and a second transceiver module coupled to each other via one or more optical cables. The first transceiver module may include a transmitter resonator to transmit optical signals emitted from a light source, a first photodetector to detect the optical signals transmitted by the transmitter resonator and generate a photocurrent, and a first controller to receive the photocurrent from the first photodetector, determine temperature variation information of the transmitter resonator based on the photocurrent received from the first photodetector, and encode the temperature variation information in an outgoing data stream transmitted via the transmitter resonator. The second transceiver module may include a receiver resonator to receive an incoming data stream. The incoming data stream may include the outgoing data stream transmitted from the transmitter resonator. The second transceiver module may further include a second photodetector to detect optical signals of the incoming data stream and generate a photocurrent and a second controller to receive the photocurrent from the second photodetector, extract the temperature variation information of the transmitter resonator from the photocurrent received from the second photodetector, and adjust a temperature of the receiver resonator based on the temperature variation information of the transmitter resonator such that the temperature of the receiver resonator is synchronized with that of the transmitter resonator.

In the examples described herein, each of the transmitter resonator and the receiver resonator is a ring resonator and referred to as a transmitter ring resonator and a receiver ring resonator, respectively. A ring resonator generally includes a closed loop (e.g., circular) waveguide coupled to one or more bus waveguides. In an example, each receiver ring resonator includes a notch filter configuration having a circular waveguide coupled to one bus waveguide. One end of the bus waveguide includes an optical input port and the other end includes an optical output port. In an example, each transmitter ring resonator includes an add-drop configuration having a circular waveguide coupled to two bus waveguides—a first waveguide and a second waveguide. The first and second waveguides are situated parallel to each other and the circular waveguide is placed between the first and second waveguides. One end of the first waveguide includes an optical input port and the other end includes an optical output port (also referred to as a pass-through output port). Depending on the input port's physical location, optical signals in the circular waveguide may rotate clockwise or counter-clockwise and travel to one of the ends, another optical output port that servers as a drop port, of the second waveguide depending on the direction of the optical signals.

Examples are further described herein with reference to FIGS. 1-6. It should be noted that the description and figures merely illustrate the principles of the present subject matter along with examples described herein, and should not be construed as limiting the present subject matter. Any functionality described herein as performed by a component (e.g., a controller) of an optical communication system may be performed by at least one processing resource of the component executing instructions (stored on a machine-readable storage medium) to perform the functionalities described herein. Various implementations of the present subject matter have been described below by referring to several examples.

Figure 1:
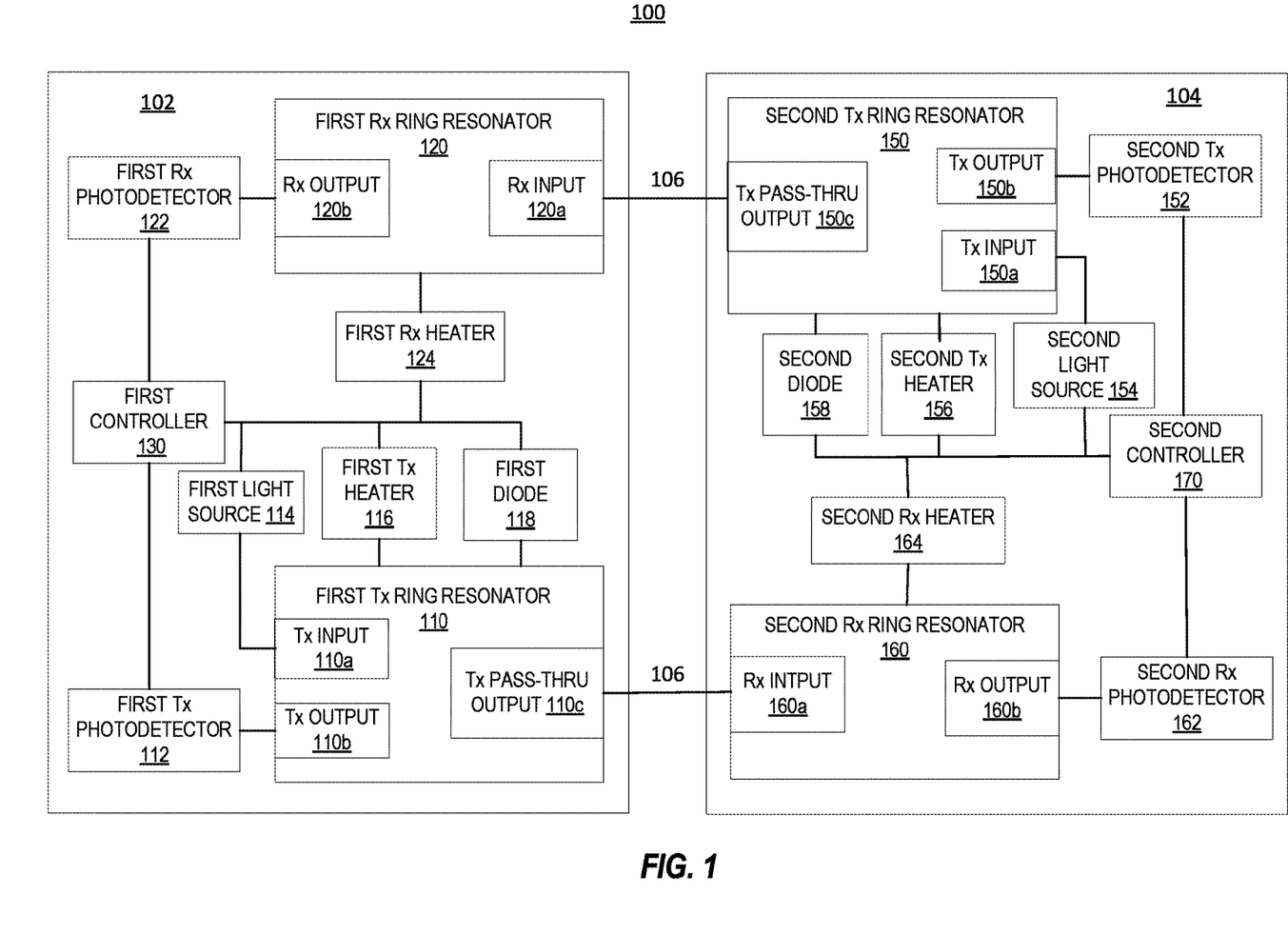
FIG. 1 illustrates an example optical communication system including a first transceiver module and a second transceiver module.

FIG. 1 illustrates an optical communication system 100 according to an example. The optical communication system 100 may include a first transceiver module 102 and a second transceiver module 104. It should be understood that although two transceiver modules are illustrated in FIG. 1, more transceiver modules can be included in the optical communication system 100. The first transceiver module 102 and the second transceiver module 104 may be connected to each other through optical cables 106.

The first transceiver module 102 may include a first transmitter (Tx) ring resonator 110 and a first receiver (Rx) ring resonator 120. The second transceiver module 104 may include a second Tx ring resonator 150 and a second Rx ring resonator 160. In the examples described herein, the second Tx ring resonator 150 may be similar to the first Tx ring resonator 110 and the second Rx ring resonator 160 may be similar to the first Rx ring resonator 120.

In the first transceiver module 102, the first Tx ring resonator 110 may include an optical input port (Tx input) 110a, an optical output port (Tx output) 110b, and a pass-through output port (Tx pass-thru output) 110c. The first Tx ring resonator 110 may be optically coupled to a light source 114 at the Tx input 110a. The light source 114 may emit optical signals to be modulated by the first Tx ring resonator 110. The light source 114 may include one or more laser diodes to emit optical signals at various wavelengths. The Tx input 110a may receive the optical signals emitted by the light source 114.

The Tx output 110b may be optically coupled to a photodetector (i.e., a first Tx photodetector) 112 to detect the optical signals transmitted by the first Tx ring resonator 110. In an example, the optical signals received by the first Tx ring resonator 110 may be filtered at the Tx output 110b and can be detected by the first Tx photodetector 112. The first Tx photodetector 112 may detect the optical signals at the Tx output 110b and convert the optical signals to electrical signals to generate a photocurrent (i.e., Tx photocurrent). In some examples, the first Tx photodetector 112 may be a photodiode.

The optical signals received by the first Tx ring resonator 110 may be transmitted as a data stream (i.e., outgoing data stream) via the Tx pass-thru output 110c to a destination, for example, a second Rx ring resonator 160 at the second transceiver module 104.

The first Rx ring resonator 120 may include an optical input port (Rx input) 120a and an optical output port (Rx output) 120b. The Rx input 120a may receive optical signals of an incoming data stream from an external source (e.g., the second Tx ring resonator 150 of the second transceiver module 104). The first Rx ring resonator 120 may modulate the received optical signals and transmit the modulated optical signals at the Rx output 120b. A photodetector (i.e., a first Rx photodetector) 122 may be optically coupled to the Rx output 120b to detect the optical signals at the Rx output 120b. Upon detecting the optical signals, the first Rx photodetector 122 may convert the optical signals to electrical signals to generate a photocurrent (i.e., Rx photocurrent). In some example, the first Rx photodetector 122 may be a photodiode.

The first transceiver module 102 may also include a first Tx heater 116 and a first diode 118 disposed at or close to the Tx ring resonator 110, and a first Rx heater 124 disposed at or close to the first Rx ring resonator 120. The first Tx heater 116 may provide thermal energy to adjust the temperature of the first Tx ring resonator 110 and the first Rx heater 124 may provide thermal energy to adjust the temperature of the first Rx ring resonator 120. The first diode 116 may modulate optical signals as desired. In some examples, the first diode 116 may modulate the optical signals in a speed at the order of nanoseconds or faster.

The first transceiver module 102 may further include a first controller 130 to control the operations of the first Tx ring resonator 110 and the first Rx ring resonator 120. The first controller 130 may be coupled to the first light source 114, the first Tx photodetector 112, the first Rx photodetector 122, the first Tx heater 116, the first diode 118, and the first Rx heater 124. The first controller 130 may control, by providing control signals, to these components to perform various functions described herein. In an example, the first controller 130 may include at least a processing resource communicatively coupled to a machine-readable storage medium including instructions that, when executed by the at least one processing resource, cause the first controller 130 to perform certain functions. The first controller 130 may be a computing device, or instead be a service or application executing on one or more computing devices. In some examples, the first controller 130 may be an application-specific integrated circuit (ASIC).

In an example, the optical signals emitted from the first light source 114 may be received at the Tx input 110a, modulated by the first Tx ring resonator 110, and then transmitted via the Tx pass-thru output 110c to the second Rx ring resonator 160 of the second transceiver module 104. Prior to transmitting the optical signals to the second Rx ring resonator 160, the first Tx photodetector 112 may detect the optical signals at the Tx output 110b, generate a Tx photocurrent, and send the Tx photocurrent to the first controller 130. The first controller 130 may implement various control techniques disclosed herein. The first controller 130, when performing control functions related to the first Tx ring resonator 110, can be referred to as a first Tx controller.

The first Rx photodetector 120 may detect optical signals at the optical output 112b, generate an Rx photocurrent by converting the detected optical signals to electrical signals, and send the Rx photocurrent to the first controller 130 to implement various control techniques disclosed herein. The first controller 130, when performing control functions related to the first Rx ring resonator 120, can be referred to as a first Rx controller.

In the second transceiver module 104, the second Tx ring resonator 150 may include an optical input port (Tx input) 150a, an optical output port (Tx output) 150b, and a pass-through output port (Tx pass-thru output) 150c. The second Tx ring resonator 150 may be optically coupled to a second light source 154 at the Tx input 150a. The second light source 154 may emit optical signals to be modulated by the second Tx ring resonator 150. The second light source 154 may include one or more laser diodes to emit optical signals at various wavelengths. The Tx input 150a may receive the optical signals emitted by the second light source 154. The optical output 150b may be optically coupled to a photodetector (i.e., a second Tx photodetector) 152 to detect the optical signals at the Tx output 150b. In some examples, the second Tx photodetector 152 may be a photodiode.

The optical signals received by the second Tx ring resonator 150 may be transmitted as a data stream (i.e., outgoing data stream) via the Tx pass-thru output 150c to a destination, for example, the first Rx ring resonator 120 at the first transceiver module 102. In the illustrated example in FIG. 1, the Tx pass-thru output 150c of the second transceiver module 104 is connected to the Rx input 120a of the first transceiver module 102 via the optical cable 106.

The second Rx ring resonator 160 may include an optical input port (Rx input) 160a and an optical output port (Rx output) 160b. The Rx input 160a may receive optical signals from an external source, e.g., the first Tx ring resonator 110 of the first transceiver module 102. In the illustrated example in FIG. 1, the Rx input 160a at the second transceiver module 104 is connected to the Tx pass-thru output 110c at the first transceiver module 102 via the optical cable 106. The second Rx ring resonator 160 may modulate and transmit the received optical signals to the Rx output 160b. A photodetector (i.e., a second Rx photodetector) 162 may be optically coupled to the Rx output 160b to detect the optical signals at the Rx output 160b.

The second transceiver module 104 may also include a second Tx heater 156 and a second diode 158 disposed at or close to the second Tx ring resonator 150 and a second Rx heater 164 disposed at or close to the second Rx ring resonator 160. The second Tx heater 156 may provide thermal energy to adjust the temperature of the second Tx ring resonator 150 and the second Rx heater 164 may provide thermal energy to adjust the temperature of the second Rx ring resonator 160. The second diode 158 may modulate optical signals as desired. In some examples, the second diode 158 may modulate optical signals in a speed at the order of nanoseconds or faster.

The second transceiver module 104 may further include a second controller 170 to control the operations of the second Tx ring resonator 150 and the second Rx ring resonator 160. The second controller 170 may be coupled to the second light source 154, the second Tx photodetector 152, the second Rx photodetector 162, the second Tx heater 156, the second diode 158, and the second Rx heater 164. The second controller 170 may control, by providing control signals, to these components to perform various functions described herein. In an example, the second controller 170 may include at least a processing resource communicatively coupled to a machine-readable storage medium including instructions that, when executed by the at least one processing resource, cause the second controller 170 to perform certain functions. The second controller 170 may be a computing device, or instead be a service or application executing on one or more computing devices. In some examples, the second controller 170 may be an application-specific integrated circuit (ASIC).

The functions of the components of the second transceiver module 104 are similar to corresponding components of the first transceiver module 102 and can be referred to the above description. The second controller 170, when performing control functions related to the second Tx ring resonator 150 can be referred to as a second Tx controller and when performing control functions related to the second Rx ring resonator 160, can be referred to as a second Rx controller.

The optical signals that can be communicated in the optical cables 106 may be based on dense wavelength-division multiplexing (DWDM) technology, or other suitable optical communication protocols.

While the techniques described herein are from the perspective of the first transceiver module 102, it should be understood that the techniques can be applied to any transceiver module in the optical communication system 100, including the second transceiver module 104. Similarly, when techniques described herein are from the perspective of the second transceiver module 104, they can be applied in the same manner to the first transceiver module 102.

In the boot up stage at the first transceiver module 102, the first controller 130 may provide control signals to the first Tx heater 116 to prepare (e.g., heat) the first Tx ring resonator 110 to an operation temperature. Once the first Tx ring resonator 110 is at the operation temperature, the first controller 130 may instruct the first light source 114 to emit optical signals and the first diode 118 to begin modulating the optical signals input to the first Tx ring resonator 110 via the Tx input 110a. The first controller 130 may then instruct the first Tx photodetector 112 to detect the optical signals at the Tx output 110b and provide the generated Tx photocurrent to the first controller 130.

The first controller 130 may determine temperature variation information of the first Tx ring resonator 110 based on the received Tx photocurrent. In an example, the first controller 130 may determine the temperature variation information based on a direct current (DC) component of the Tx photocurrent.

The temperature variation information may include a temperature variation value and a temperature variation rate of the first Tx ring resonator 110 caused due to changes in the surrounding temperature because of e.g.; heat generated during the operation. A temperature variation value may be a temperature difference in a subsequent temperature (i.e., a later temperature) of the first Tx ring resonator 110 from an initial or previous temperature of the first Tx ring resonator 110 (e.g., during operation). In some instances, the temperature variation value may be zero, indicating that there is no temperature variation at the first Tx ring resonator 110 over a period of time (e.g.; a detection interval). The detection interval may vary from femtoseconds to hours depending on the circuit design and implementation of the first transceiver module 102. A temperature variation rate may be a rate of change of the temperature w.r.t, the previous temperature. In an example, the temperature variation rate may include a rate of increase or decrease in the temperature from the previous temperature of the first Tx ring resonator 110 over the period of time. The temperature may be more or less than the previous temperature. As a non-limiting example, the temperature variation rate may be 1° C./min, −1° C./min, etc.

In some examples, the first controller 130 may extract the DC component of the Tx photocurrent and determine the temperature variation information based on the DC component. The DC component of the Tx photocurrent may follow a transfer function of the first Tx ring resonator 110.

Figure 2:
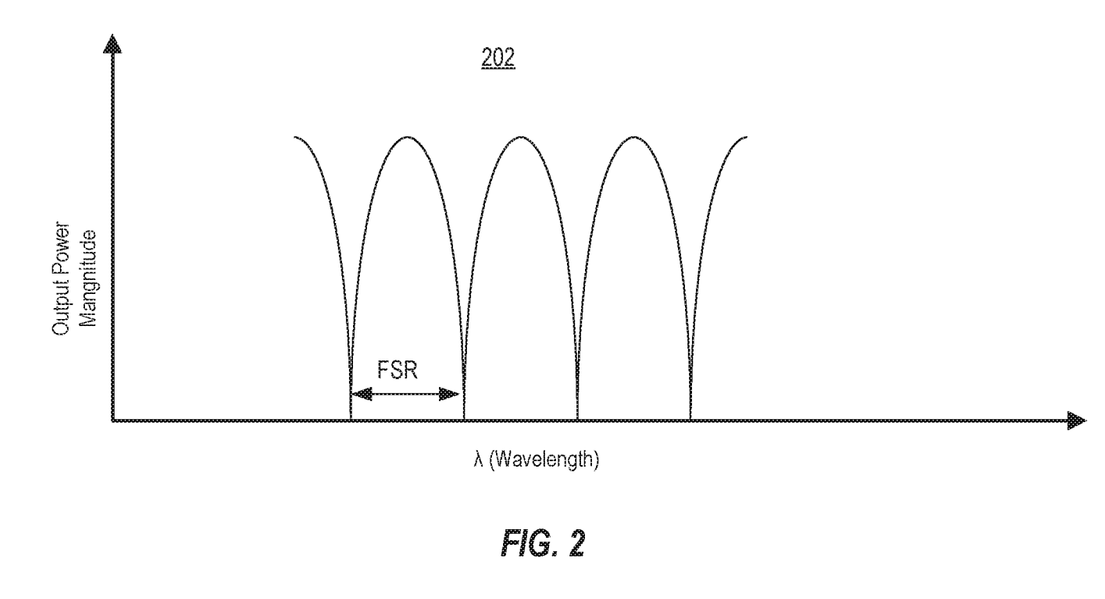
FIG. 2 shows a transfer function of an example ring resonator.

A transfer function of a ring resonator may represent an output power magnitude of optical signals transmitted by the ring resonator as a function of wavelength. The transfer function of the ring resonator may vary as the temperature of the ring resonator varies, FIG. 2 shows an example transfer function 202 of a ring resonator at a temperature. As illustrated, the transfer function of the ring resonator may follow a curve as shown in FIG. 2, which can be estimated by a Lorentzian mathematical function. The curve has a number of bumps defining a number of minima and a number of maxima. Each minimum in the curve shows a WoR, which depends on the dimensions of the ring resonator. The distance between two adjacent WoRs is defined as free spectral range (FSR). An FSR and a number of minima may be obtained from the transfer function 202 at that temperature.

In an example, a transfer function of the first Tx ring resonator 110 at a given temperature (i.e., a reference temperature) may be used as a reference transfer function. An FSR (i.e., a reference FSR) and a number of minima (i.e., a reference number of minima) of the reference transfer function of the first Tx ring resonator 110 may be obtained and used to calculate a temperature variation value of the first Tx ring resonator 110.

In an example, when a transfer function of the first Tx ring resonator 110 is obtained from the DC component of the Tx photocurrent, a corresponding FSR and a number of minima may be obtained from the transfer function. Using the obtained FSR, the obtained number of minima, the reference FSR, the reference number of minima and spectral shift of silicon (i.e., 0.073 nm/C), a temperature variation value of the first Tx ring resonator 110 can be calculated. For example, if an obtained FSR is 0.5 nm and an obtained number of minima is 5 for an obtained transfer function of the first Tx ring resonator 110, then the temperature of the first Tx ring resonator 110 is varied 34.2 degrees Celsius from the reference temperature. Furthermore, by following the gradient (or derivative) of the bumps, a temperature variation rate can be determined. Furthermore, if the gradient is positive, the temperature is increasing and if the gradient is negative, the temperature is decreasing.

When the temperature variation value is a non-zero value, the first controller 130 may encode the temperature variation information in an outgoing data stream transmitted via the first Tx ring resonator 110. For example, the first controller 130 may instruct the first diode 118 to write the temperature variation information at a designated section of the outgoing data stream. As a non-limiting example, the designated section may be a header of a data packet or a data section reserved specifically for the temperature variation information. This technique allows the communication of real-time temperature variation information of the first Tx ring resonator 110 to a receiver module, e.g., the second Rx ring resonator 160 of the second transceiver module 104.

The outgoing data stream including the temperature variation information may be received as an incoming data stream at the Rx input 160a of the second Rx ring resonator 160. In an example, the incoming data stream includes the outgoing data stream transmitted from the first Tx ring resonator 110. The second Rx ring resonator 160 may modulate and transmit the incoming data stream to the Rx output 160b. The second Rx photodetector 162 may detect the optical signals of the incoming data stream, generate a corresponding Rx photocurrent and send the Rx photocurrent to the second controller 170. The second controller 170 may extract the temperature variation information from the Rx photocurrent. In an example, the second controller 170 may instruct the second diode 158 to decode the temperature variation information from the Rx photocurrent. From the temperature variation information, the second controller 170 may determine the temperature variation value and the temperature variation rate of the first Tx ring resonator 110. Based on the determined temperature variation information (e.g., the determined temperature variation value and the temperature variation rate) and the previous temperature of the first Tx ring resonator 110, the second controller 170 may determine a temperature of the first Tx ring resonator 110 (e.g., at a point in time when the first Tx ring resonator 110 transmitted the optical signals to the Tx output 110b). In an example, the second controller 170 may instruct the heater 164 to adjust the temperature of the second Rx ring resonator 160 based on the determined temperature of the first Tx ring resonator 110 such that the temperature of the second Rx ring resonator 160 is in synchronization with that of the temperature of the first Rx ring resonator 110.

As understood to those skilled in the art, there may be some time lag in detecting the optical signals transmitted by the first Tx ring resonator 110 at the first transceiver module 102 and extracting the temperature variation information by the second controller 170 at the second transceiver module 104. In some examples, the second controller 170 may determine a temperature of the first Tx ring resonator 110 either at a point in time when the second controller 170 extracts the temperature variation information from the Rx photocurrent or at a later point in time based on the temperature variation information. In an example, the second controller 170 may predict or calculate a temperature of the first Tx ring resonator 110, at that point in time or a later point in time, based on the temperature variation value and the temperature variation rate. For example, by using the rate of increase or decrease in temperature and the temperature variation value (i.e., a difference in the latest temperature from the previous temperature), the second controller 170 may predict or calculate a temperature of the first Tx ring resonator 110 at that point in time or a later point in time. In an example, the second controller 170 may predict or calculate a temperature of the first Tx ring resonator 110 at a point in time prior to receiving the next temperature variation information (e.g., as per the detection interval). In these examples, the second controller 170 may instruct the second Rx heater 164 to adjust the temperature of the second Rx ring resonator 160 based on the predicted or calculated temperature of the first Tx ring resonator 110, at that point in time or a later point in time, such that the temperature of the second Rx ring resonator 160 is synchronized with that of the first Tx ring resonator 110.

In some examples, the temperature variation value, even if zero, may be periodically encoded in the outgoing data stream transmitted from the first Tx ring resonator 110 of the first transceiver module 102 to the second Rx ring resonator 160 of the second transceiver module 104. If the temperature variation value is zero, the second controller 170 may not adjust the temperature of the second Rx ring resonator 160. In some examples, after the first controller 130 of the first transceiver module 102 obtains the temperature variation information, the first controller 130 may determine whether the temperature variation value is greater than a threshold. If or when (e.g., in response to) the temperature variation value is greater than the threshold, the first controller 130 may encode the temperature variation information in the outgoing data stream transmitted via the first Tx ring resonator 110. If or when (e.g., in response to) the temperature variation value is equal to or less than the threshold, the first controller 130 may not encode the temperature variation information in the outgoing data stream even if the temperature variation value is a non-zero value. This technique may prevent the second controller 170 of the second transceiver module 104 from adjusting the temperature of the second Rx ring resonator 160 based on trivial temperature variations at the first Tx ring resonator 110.

In some examples, the first controller 130 may classify temperature variation information of the first Tx ring resonator 110 based on the temperature variation values into multiple levels, each presented by a temperature code. As a non-limiting example, a level may represent 1 degree Celsius (° C.) variation. For example, temperature variation values of 2.1° C. and 2.9° C. may be classified at the same level, while 1.9° C. and 2.1° C. are classified at different levels. The first controller 130 may then encode the temperature code in the outgoing data stream transmitted via the first Tx ring resonator 110. Based on the temperature code, the second controller 170 may control the second Rx heater 164 to adjust the temperature of the second Rx ring resonator 160. In some examples, the level distance may be progressive. As a non-limiting example, a lower level may have a greater level distance than that of a higher level. For example, level 1 may be 0-3° C., level 2 may be 3-4.5° C., and level 3 may be 4.5-5.5° C. A progressive level classification may reflect that smaller temperature variation values may not significantly disrupt data communications between the first Tx ring resonator 110 and the second Rx ring resonator 160, while larger temperature variation values tend to negatively affect the integrity of the data communications.

In some examples, the first controller 130 may periodically receive the Tx photocurrent from the first Tx photodetector 112. In an example, the Tx photocurrent may be periodically received in a detection interval. A detection interval may be a time interval between two photocurrents such that no photocurrent is received between the two photocurrents. The first controller 130 may periodically extract the DC component of the Tx photocurrent, determine the temperature variation information based on the DC component, and periodically encode the temperature variation information in the outgoing data stream transmitted via the first Tx ring resonator 110. In some examples, the second controller 170 may periodically receive the Rx photocurrent from the second photodetector, periodically extract the temperature variation information of the first Tx ring resonator 110 from the Rx photocurrent received from the second Rx photodetector 162 and periodically adjust the temperature of the second Rx ring resonator 160 based on the temperature variation information extracted from the Rx photocurrent as necessary in order to synchronize the temperature of the second Rx ring resonator 160 with that of the first Tx ring resonator 110.

The techniques, as described herein, help in accurately synchronizing the temperature of the second Rx ring resonator 160 of the second transceiver module 104 to that of the first Tx ring resonator 110 of the first transceiver module 102. In particular, the techniques help in synchronizing thermal shifts of the first Tx ring resonator 110 and the second Rx ring resonator 160, which in turn reduces data communication errors and provides a stable data communication therebetween.

In some examples, similar techniques may be employed to communicate temperature variation information of the second Tx ring resonator 150 of the second transceiver module 104 to the first Rx ring resonator 120 of the first transceiver module 102 to enable the first controller 130 to adjust the temperature of the first Rx ring resonator 120 such that the temperature of the first Rx ring resonator 120 is synchronized with that of the second Tx ring resonator 150.

Figure 3:
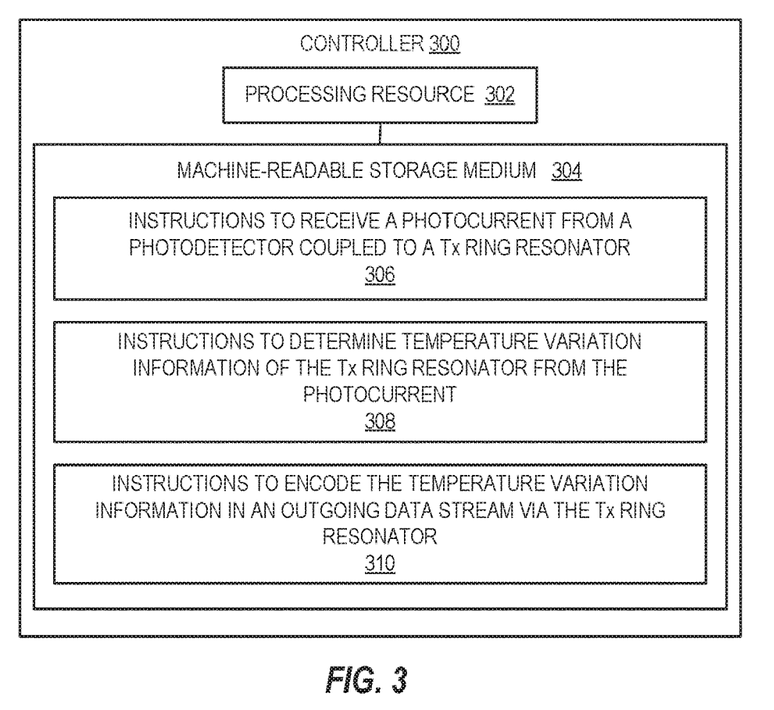
FIG. 3 is a block diagram of an example controller implemented in a transceiver module of an optical communication system.

FIG. 3 is block diagram of an example controller 300 that communicates temperature variation information of a Tx ring resonator from a transceiver module to another transceiver module in an optical communication system. The controller 300 includes a processing resource 302 and a machine-readable storage medium 304 encoded with example instructions 306, 308 and 310. The controller 300 may be a computing device, or instead be a service or application executing on one or more computing devices. In an example, the controller 300 may be included in one or both the first controller 130 and the second controller 170. For ease of illustration, FIG. 3 will be described with reference to FIG. 1. In certain examples, the instructions 306-310 may be executed for performing the functionalities of the first controller 130 and a method 500 described in FIG. 5. In certain examples, as an alternative or in addition to executing the instructions 306-310, the processing resource 302 may include at least one IC, other control logic, other electronic circuitry, or combinations thereof that include a number of electronic components for performing the functionalities described herein as being performed by the first controller 130.

Instructions 306, when executed by the processing resource 302, may receive a Tx photocurrent from the Tx photodetector 112 on detecting the optical signals transmitted by the first Tx ring resonator 110.

Instructions 308, executed by the processing resource 302, may determine temperature variation information of the first Tx ring resonator 110 based on the Tx photocurrent. In an example, the instructions 308, when executed by the processing resource 302, may extract a DC component of the Tx photocurrent and then determine the temperature variation information from the DC component of the Tx photocurrent.

Instructions 310, executed by the processing resource 302, may encode the temperature variation information in an outgoing data stream transmitted via the first Tx ring resonator 110.

The instructions 306-310 may include various instructions to execute at least a part of the method described in FIG. 5 (described later). Also, although not shown in FIG. 3, the machine-readable storage medium 304 may also include additional program instructions to perform various other method blocks described in FIG. 5.

Figure 4:
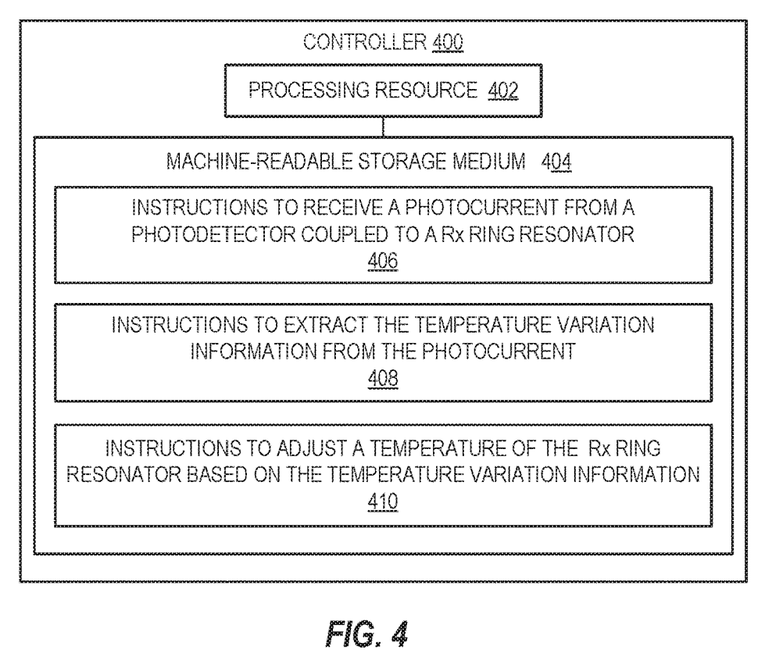
FIG. 4 is a block diagram of an example controller implemented in a transceiver module of an optical communication system.

FIG. 4 is block diagram of an example controller 400 that adjusts a temperature of an Rx ring resonator in a transceiver module in an optical communication system. The controller 400 includes a processing resource 402 and a machine-readable storage medium 404 encoded with example instructions 406, 408 and 410. The controller 400 may be a computing device, or instead be a service or application executing on one or more computing devices. In an example, the controller 400 may be included in one or both the first controller 130 and the second controller 170. For ease of illustration, FIG. 4 will be described with reference to FIG. 1. In certain examples, the instructions 406-410 may be executed for performing the functionalities of the second controller 170 and a method 600 described in FIG. 6. In certain examples, as an alternative or in addition to executing the instructions 406-410, the processing resource 402 may include at least one IC, other control logic, other electronic circuitry, or combinations thereof that include a number of electronic components for performing the functionalities described herein as being performed by the second controller 170.

Instructions 406, when executed by the processing resource 402, may receive an Rx photocurrent from the second Rx photodetector 162 generated on detecting the optical signals of an incoming data stream. In an example, the incoming data stream includes an outgoing data stream, that includes the temperature variation information of the first Tx ring resonator 110, transmitted from the first Tx ring resonator 110.

Instructions 408, when executed by the processing resource 402, may extract the temperature variation information of the first Tx ring resonator 110 from the Rx photocurrent.

Instructions 410, when executed by the processing resource 402, may adjust a temperature of the second Rx ring resonator 160 based on the extracted temperature variation information of the first Tx ring resonator 110 such that the temperature of the second Rx ring resonator 160 is synchronized with that of the first Tx ring resonator 110. In an example, the instructions 410 when executed by the processing resource 402, may determine a temperature of the first Tx ring resonator 110, at a point in time, based on the temperature variation information and then adjust a temperature of the second Rx ring resonator 160 based on the determined temperature of the first Tx ring resonator 110.

The instructions 406-410 may include various instructions to execute at least a part of the method described in FIG. 6 (described later). Also, although not shown in FIG. 4, the machine-readable storage medium 404 may also include additional program instructions to perform various other method blocks described in FIG. 6.

Figure 5:
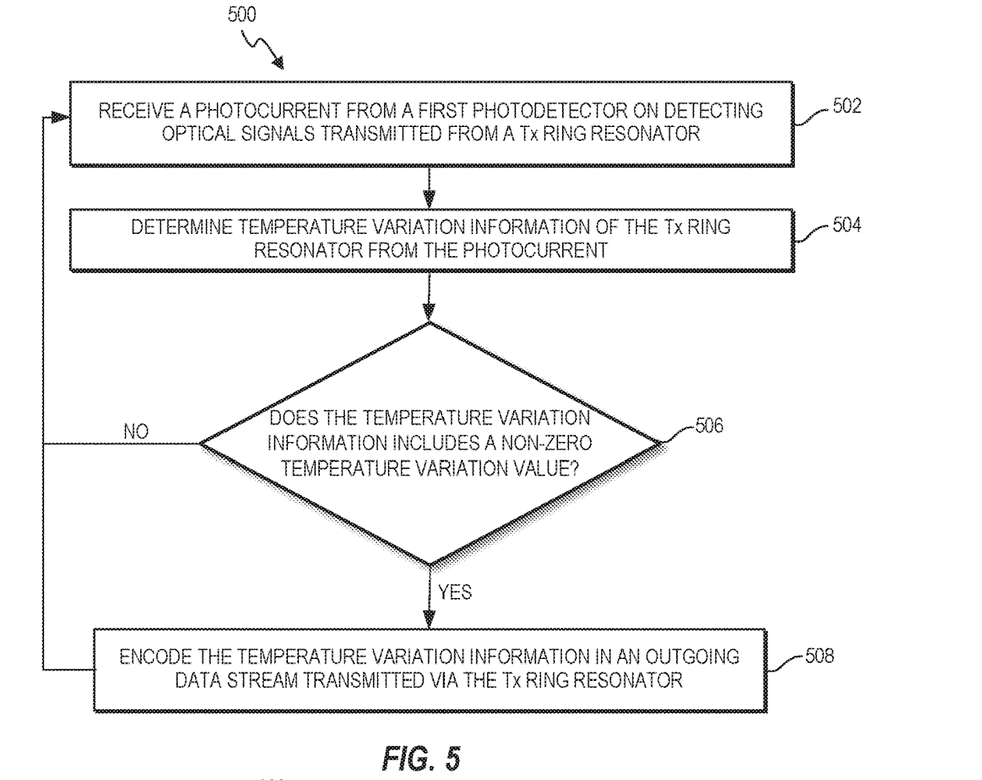
FIG. 5 is a flowchart illustrating an example method for communicating temperature variation information of a transmitter resonator of a transceiver module to a receiver resonator of another transceiver module in an optical communication system.
Figure 6:
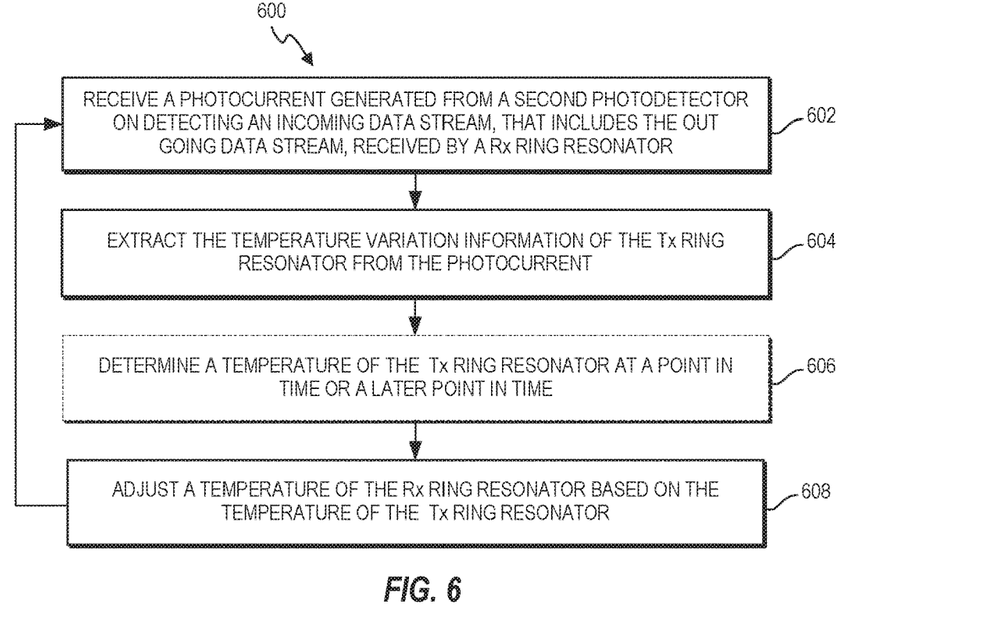
FIG. 6 is a flowchart illustrating an example method for adjusting a temperature of a receiver resonator of a transceiver module based on temperature variation information of a transmitter resonator of another transceiver module in an optical communication system.

FIGS. 5 and 6 depict flowcharts illustrating example methods 500 and 600 for obtaining temperature synchronization in transceiver modules in an optical communication system. The methods 500 and 600 can be performed by a controller (e.g., the first controller 130 or the second controller 170) of a transceiver module (e.g., the transceiver module 102 or 104) in an optical communication system (e.g., optical communication system 100 of FIG. 1). Although the below description is described with reference to the first controller 130 and the second controller 170 of FIG. 1, however other applications or devices suitable for the execution of methods 500 and 600 may be utilized. Although the flowcharts of FIGS. 5 and 6, individually, show a specific order of performance of certain functionalities, methods 500 and 600 are not limited to such order. For example, the functionalities shown in succession in the flowcharts may be performed in a different order, may be executed concurrently or with partial concurrence, or a combination thereof.

FIG. 5 depicts a flowchart of the example method 500 for communicating temperature variation information from a transceiver module to another transceiver module in an optical communication system. For ease of illustration, the execution of example method 500 is described in details below with reference to FIG. 1. In some examples, the method 500 may be performed by the first controller 130. In some other examples, the method 500 at each such method blocks may be executed by the controller 300 via the processing resource 302 that executes the instructions 306-310 stored in the machine-readable storage medium 304. Additionally, implementation of the method 500 is not limited to such examples.

In block 502, the method 500 may include receiving a Tx photocurrent from the first Tx photodetector 112. The first Tx photodetector 112 detects the optical signals at the Tx output 110b transmitted from the first Tx ring resonator 110 and converts the optical signals to electrical signals to generate the Tx photocurrent.

In block 504, the method 500 may include determining temperature variation information of the first Tx ring resonator 110 from the Tx photocurrent. In an example, the method 500 includes extracting a DC component of the Tx photocurrent and determining the temperature variation information from the DC component of the Tx photocurrent. As described above, the temperature variation information may be determined using a transfer function of the first Tx ring resonator 110, as shown in FIG. 2. The temperature variation information may include a temperature variation value and a temperature variation rate.

In block 506, the method 500 may include determining whether the temperature variation information of the first Tx ring resonator 110 includes a non-zero temperature variation value. If the temperature variation value is a zero value ('NO' at 506), the method 500 returns to 502. When the temperature variation value is a zero value, it indicates that no temperature variation is detected at the first Tx ring resonator 110 and thus there is no need to inform the second transceiver module 104 of any temperature variation. If the temperature variation value is a non-zero ('YES' at 506), the method 500 may proceed to block 508.

In some example, the method 500 may include determining whether the non-zero value is greater than a temperature variation threshold. If the non-zero value is equal to or less than the temperature variation threshold, the method 500 returns to 502. When the non-zero value is equal to or less than the temperature variation threshold, it indicates that the temperature variation at the first Tx ring resonator 110 is not significant to warrant a notice to the second transceiver module 104. If the non-zero value is greater than the temperature variation threshold, the method 500 may proceed to block 508.

In block 508, the method 500 may include encoding the temperature variation information in an outgoing data stream transmitted via the first Tx ring resonator 110 destined to the second Rx ring resonator 160 of the second transceiver module 104.

The temperature variation information of the first Tx ring resonator 110 received by the second Rx ring resonator 160 enables the second transceiver module 104 to make a corresponding temperature adjustment to the second Rx ring resonator 160.

In some implementations, block 506 may be omitted. Depending on operation protocols defined for the first transceiver module 102 and the second transceiver module 104, when the operation 506 is omitted, the operation can be performed by the second transceiver module 104 in determining whether to adjust the temperature of its second Rx ring resonator 160.

FIG. 6 is a flow chart illustrating an example method 600 for adjusting a temperature of an Rx ring resonator of a transceiver module in an optical communication system. For ease of illustration, the execution of example method 600 is described in details below with reference to FIG. 1. In some examples, the method 600 may be performed by the second controller 170. In some examples, the method 600 at each such method blocks may be executed by the controller 400 via the processing resource 402 that executes the instructions 406-410 stored in the machine-readable storage medium 404. Additionally, implementation of the method 600 is not limited to such examples.

In block 602, the method 600 may include receiving an Rx photocurrent from the second Rx photodetector 162. The second Rx photodetector 162 may detect the optical signals of an incoming data stream. In an example, the incoming data stream includes the outgoing data stream, that includes the temperature variation information of the first Tx ring resonator 110, transmitted from the first Tx ring resonator 110.

In block 604, the method 600 may include extracting the temperature variation information of the first Tx ring resonator 110 from the Rx photocurrent.

In block 608, the method 600 may include adjusting a temperature of the second Rx ring resonator 160 based on the extracted temperature variation information of the first Tx ring resonator 110.

In some examples, the method may include block 606. In block 606, a temperature of the first Tx ring resonator 110 at a point in time may be determined based on the temperature variation information. In these examples, in block 608, a temperature of the second Rx ring resonator 160 may be adjusted based on the determined temperature of the first Tx ring resonator 110 such that the temperature of the second Rx ring resonator 160 is synchronized with that of the first Tx ring resonator 110.

The techniques, as described herein, enable to communicate temperature variation information of a transmitter ring resonator of a transceiver module and a receiver ring resonator of another transceiver module so as to obtain the temperature synchronization with high accuracy. The techniques enable to synchronize the temperature shifts of the transmitter and receiver ring resonators, which in turn reduces data communication errors and provide a stable data communication therebetween. In contrast to the conventional schemes where temperatures are indirectly measured with link quality parameters such as BER counts or measured by an electronic device, the techniques disclosed herein provide accurate and real-time temperature variation information. In addition, since the described techniques enable encoding the temperature variation information in the outgoing data stream, the receiving end can synchronize the temperature with better accuracy and less complexity.

As used herein, a controller might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality.

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1, 2, and 3, each of the first controller 130 and the second controller 170 may be implemented by one machine-readable storage medium, or multiple machine-readable storage media.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). All of the features disclosed in this specification (including any accompanying claims, abstract and drawings), and/or all of the elements of any method or process so disclosed, may be combined in any combination, except combinations where at least some of such features and/or elements are mutually exclusive.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

The invention claimed is:

1. A transceiver module, comprising:
   a transmitter resonator to transmit optical signals emitted from a light source;
   a photodetector coupled to the transmitter resonator to detect the optical signals transmitted by the transmitter resonator and generate a photocurrent; and
   a controller to:
   receive the photocurrent from the photodetector;
   determine temperature variation information of the transmitter resonator based on the photocurrent; and
   encode the temperature variation information in an outgoing data stream transmitted via the transmitter resonator.

2. The transceiver module of claim 1, wherein the transmitter resonator comprises a ring resonator.

3. The transceiver module of claim 1, wherein the controller is to:
   extract a direct current (DC) component of the photocurrent; and
   determine the temperature variation information based on the DC component of the photocurrent.

4. The transceiver module of claim 1, wherein the temperature variation information comprises a temperature variation value and a temperature variation rate.

5. The transceiver module of claim 1, wherein the controller is to:
   periodically receive the photocurrent from the photodetector;
   periodically determine the temperature variation information based on the photocurrent; and
   periodically encode the temperature variation information in the outgoing data stream transmitted via the transmitter resonator.

6. An optical communication system comprising a first transceiver module and a second transceiver module coupled to each other via one or more optical cables,
   wherein the first transceiver module comprises:
   a transmitter resonator to transmit optical signals emitted from a light source;
   a first photodetector to detect the optical signals transmitted by the transmitter resonator and generate a corresponding photocurrent;
   a first controller configured to:
   receive the photocurrent from the first photodetector;
   determine temperature variation information of the transmitter resonator based on the photocurrent; and
   encode the temperature variation information in an outgoing data stream transmitted via the transmitter resonator; and
   wherein the second transceiver module comprises:
   a receiver resonator to receive an incoming data stream that comprises the outgoing data stream transmitted from the transmitter resonator;
   a second photodetector to detect the incoming data stream and generate a corresponding photocurrent;
   a second controller configured to:
   receive the photocurrent from the second photodetector;
   extract the temperature variation information of the transmitter resonator from the photocurrent received from the second photodetector; and
   adjust a temperature of the receiver resonator based on the temperature variation information of the transmitter resonator such that the temperature of the receiver resonator is synchronized with that of the transmitter resonator.

7. The optical communication system of claim 6, wherein each of the transmitter resonator and the receiver resonator comprises a ring resonator.

8. The optical communication system of claim 6, wherein the second controller is configured to:
   determine a temperature of the transmitter resonator, at a point in time, based on the extracted temperature variation information; and
   adjust the temperature of the receiver resonator based on the determined temperature of the transmitter resonator.

9. The optical communication system of claim 6, wherein the temperature variation information comprises a temperature variation value and a temperature variation rate.

10. The optical communication system of claim 6,
    wherein the first controller is to:
    periodically receive the photocurrent from the first photodetector;
    periodically determine the temperature variation information based on the photocurrent received from the first photodetector;
    periodically encoding the temperature variation information in the outgoing data stream transmitted via the transmitter resonator; and
    wherein the second controller is to:
    periodically extract the temperature variation information of the transmitter resonator from the photocurrent received from the second photodetector; and
    periodically adjust the temperature of the receiver resonator based on the temperature variation information.

11. A method for communicating temperature variation information, comprising:
    receiving, by a first controller, a photocurrent from a first photodetector on detecting optical signals transmitted from a transmitter resonator in a first transceiver module;
    determining, by the first controller, temperature variation information of the transmitter resonator based on the photocurrent; and
    encoding, by the first controller, the temperature variation information in an outgoing data stream transmitted via the transmitter resonator.

12. The method of claim 11, wherein the transmitter resonator comprises a ring resonator.

13. The method of claim 11, wherein the determining the temperature variation information comprises
    extracting a DC component from the photocurrent; and
    determining the temperature variation information based on the DC component of the photocurrent.

14. The method of claim 11, wherein the temperature variation information comprises a temperature variation value and a temperature variation rate.

15. The method of claim 11, further comprising:
    periodically receiving the photocurrent from the first photodetector;
    periodically determining the temperature variation information based on the photocurrent received from the first photodetector; and
    periodically encoding the temperature variation information in the outgoing data stream transmitted via the transmitter resonator.

16. The method of claim 11, further comprising:
    receiving, by a second controller, a photocurrent generated from a second photodetector on detecting optical signals of an incoming data stream received via a receiver resonator of a second transceiver module, wherein the incoming data stream comprises the outgoing data stream transmitted from the transmitter resonator;
    extracting, by the second controller, the temperature variation information of the transmitter resonator from the photocurrent received from the second photodetector; and
    adjusting, by the second controller, a temperature of the receiver resonator based on the temperature variation information of the transmitter resonator such that the temperature of the receiver resonator is synchronized with that of the transmitter resonator.

17. The method of claim 16, further comprising:
    determining, by the second controller, a temperature of the transmitter resonator, at a point in time, based on the temperature variation information; and
    adjusting, by the second controller, the temperature of the receiver resonator based on the determined temperature of the transmitter resonator.

18. The method of claim 16, wherein the receiver resonator comprises a ring resonator.

19. The method of claim 16, further comprising:
    periodically receiving the photocurrent from the second photodetector;
    periodically extracting the temperature variation information from the photocurrent; and
    periodically adjusting the temperature of the receiver resonator based on the temperature variation information of the transmitter resonator.

* * * * *